No. 849,374. PATENTED APR. 9, 1907.
A. A. DAUGHERTY.
VEHICLE WHEEL.
APPLICATION FILED JAN. 5, 1907.
2 SHEETS—SHEET 1.
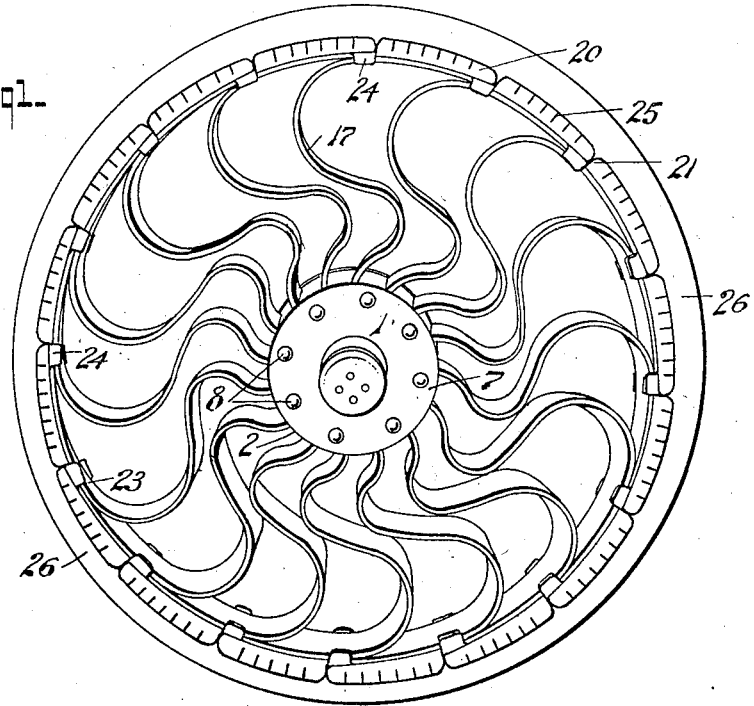
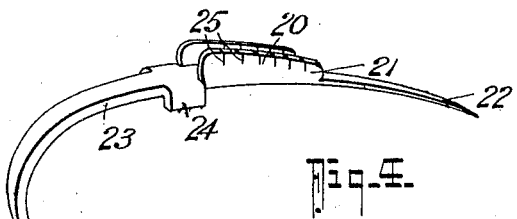
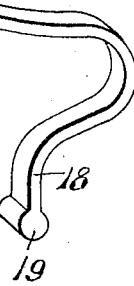
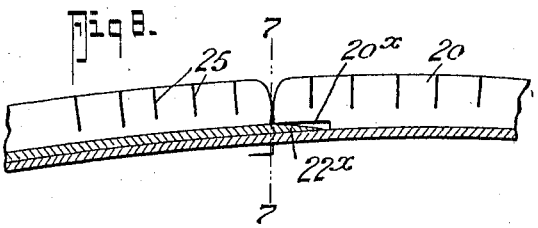
WITNESSES:
John T. Schrot
F. C. Gibson.
INVENTOR
Alvin A. Daugherty
BY
Fred G. Dieterich
ATTORNEYS.

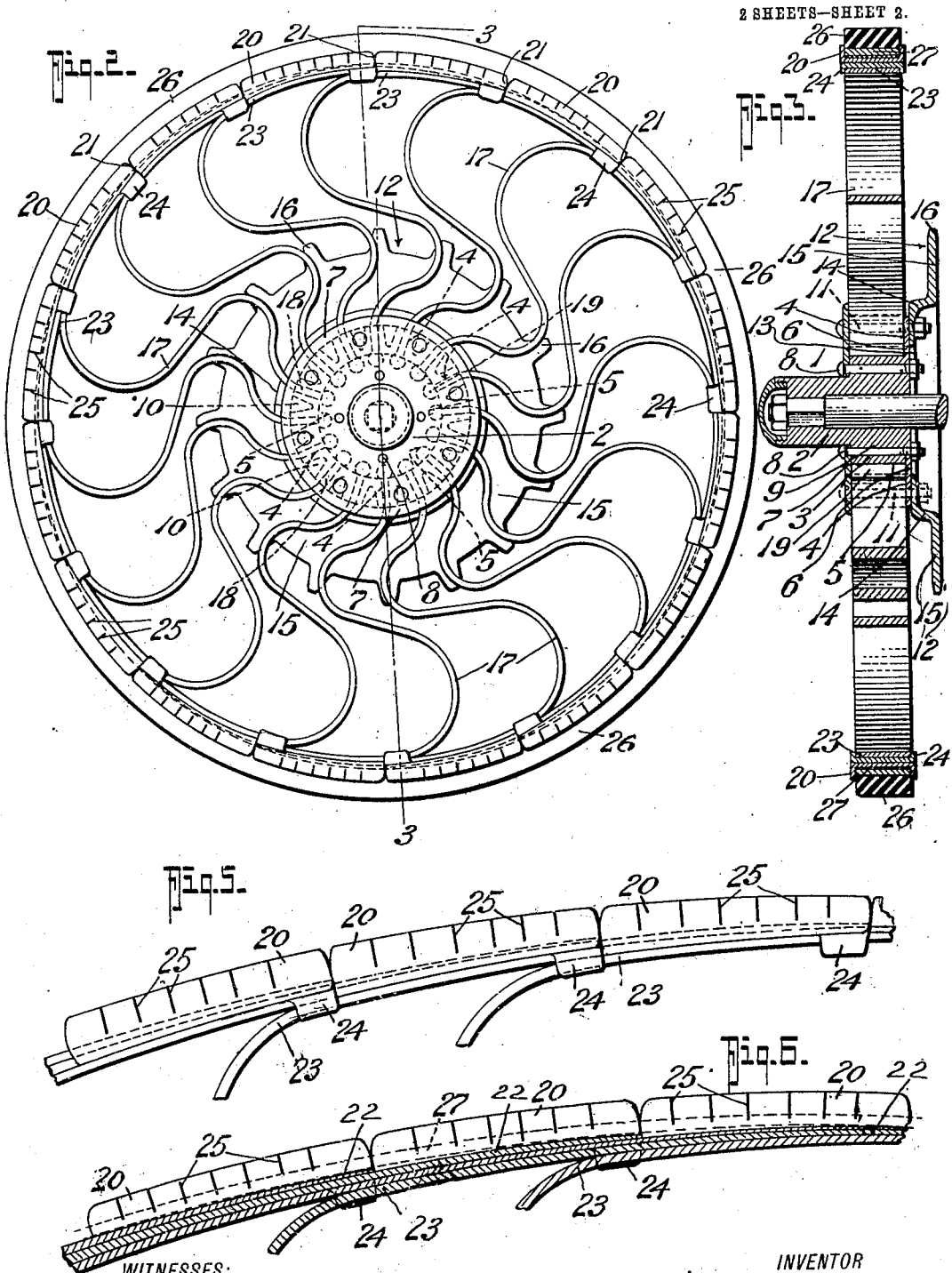

UNITED STATES PATENT OFFICE.

ALVIN ALEXANDER DAUGHERTY, OF NEW YORK, N. Y.

VEHICLE-WHEE'..

No. 849,374.  Specification of Letters Patent.  Patented April 9, 1907.

Application filed January 5, 1907. Serial No. 351,022.

*To all whom it may concern:*

Be it known that I, ALVIN ALEXANDER DAUGHERTY, residing at New York city, in the county of New York and State of New York, have invented certain new and useful Improvements in Vehicle-Wheels, of which the following is a specification.

My invention relates to certain new and useful improvements in vehicle-wheels of the shock-absorbing type, and it more particularly has for its object to provide a wheel of this character of a very simple and effective construction, which can be easily and cheaply manufactured, and which will readily and effectively serve its intended purposes.

My invention is particularly adapted for use as an automobile-wheel or a wheel for gun-carriages and the like, and in its generic nature the invention comprises a wheel having spring-spokes which overlap each other at the rim ends and provided at such ends with flange-like portions to receive and hold a belt-like tire of thin steel, rubber, or other suitable material.

The invention also includes an improved means coöperatively connecting the spokes at their overlapping ends, so as to minimize wear and add to the effective operation thereof.

In my present invention means are also provided whereby the hub ends of the spokes can be conveniently secured to the hub and in which the hub structure consists of a minimum number of parts.

In its more subordinate nature the invention consists in certain improvements on the type of vehicle-wheel disclosed in my copending application, filed July 18, 1906, Serial No. 326,706, and allowed January 4, 1907.

In its detailed nature my invention comprises certain novel construction, combination, and arrangement of parts, all of which will be first described and then be specifically pointed out in the appended claims, reference being had to the accompanying drawings, in which—

Figure 1 is a perspective view of my invention. Fig. 2 is a side elevation of a vehicle-wheel embodying my invention. Fig. 3 is a central vertical longitudinal section thereof on the line 3 3 of Fig. 2. Fig. 4 is a detail view of one spoke. Fig. 5 is an enlarged detail elevation of the overlapping ends of several spokes. Fig. 6 is a central vertical longitudinal section thereof. Figs. 7 and 8 are detail views of a slightly-modified form of my invention.

Referring now to the accompanying drawings, in which like numerals and letters of reference indicate like parts in all of the figures, 1 designates the wheel-hub, which may be of any approved type, preferably that shown in my pending application, filed on even date herewith, and consists, essentially, of the hub proper, 2, the spoke-receiving body portion 3, which is provided with a plurality of pockets 4 for the reception of the spoke ends, the pockets 4 terminating at their inner portions in circular bores 5 to receive the spoke-heads, as shown. The pockets 4 are cut into the body portion 3 from one side to leave a web 6 at the other side, and to hold the spokes in place in the hub a plate 7 is secured to the open side of the body portion 3 by bolts 8, the bolts 8 passing through apertures 9 in the body portion 3 of the hub 1, as shown. The body portion 3 of the hub 1 is also provided with peripheral pockets 10, through which and through the web 6 and plate 7 supplemental bolts 11 pass.

12 designates a sprocket member which is secured to the hub 1 by the bolts 11, and the sprocket member 12 consists of a hub-engaging plate portion 13, which is offset, as at 14, to merge with the sprocket-web 15, around the periphery of which the sprocket-teeth 16 are formed, it being understood that the spcocket 12 is only used with the wheel when it is desired to coöperate with a chain-drive. (Not shown.)

17 designate the spokes, which in my present invention are preferably formed of spring-steel and may be of a greater thickness adjacent the hub and merge to a taper at the rim extremity. The spokes 17 are bent into approximately zigzag form in side elevation and at their hub-engaging end are provided with straight portions 18 to enter the pockets 4 of the hub and terminating in cylindrical ends 19 to enter the circular bore 5 of the hub, thus preventing the spokes pulling out of the hub when the wheel is once assembled. Adjacent the rim end the spokes 17 are formed with outwardly-projecting flanges 20, the end edges of those of one spoke abutting the ends of those of adjacent spokes, and each end of the flanges 20 is slightly curved, as at 21, so that the contact edges of the flanges 20 will have a "rolling" contact, as it were, with one another when the wheel is in use. The spokes 17 terminate at the rim ends in projections 22, which lap over the next succeeding spoke and rest between the flanges 20 of such succeeding spoke, the spoke ends 22 tapering off to practically zero thickness at the end. Each spoke 17 is so bent as to have a portion 23 lap against the adjacent spoke portion beneath the flanges 20, and each spoke 17 is formed with supplemental reverse flanges 24 to embrace the sides of the spoke portions 23 where they contact with the under face of the adjacent spoke. This obviates any danger of a break of the spokes at the point where the portion 23 merges with its respective flange portion 20 and prevents sidewise movement of the adjacent spoke. Each flange 20 is slotted, as at 25, at intervals to render the same flexible, it being understood that the slots 25 may be spaced at a greater or less distance apart, as may be found advisable in practice.

26 designates the tire, which may be of any approved construction—such, for instance, as an ordinary rubber or pneumatic tire. If desired, between the tire 26 and the spoke ends I may place a continuous metallic band to relieve the tire of the strains thereon resulting from the compression of the spokes and to furthermore eliminate the friction on the tire due to movement of the overlapping ends of the spokes. I should mention, however, that in practice when the band 27 is applied it is made of a diameter slightly less than the maximum diameter of a circle touching the extreme rim ends of the spokes when the tire is not applied, so that the spokes will be more or less compressed when the tire is applied to exert a tension against the tire in a direction from the hub outward, thus insuring the tire remaining on the wheel under all conditions of operation.

In this invention, as in the invention disclosed in my pending application hereinbefore referred to, the tire 26 is preferably held in position only by the flanges 20 and no other securing means is necessary, and when conditions require the tire may be removed or replaced without difficulty.

In operation the spring-spokes by reason of their form and the manner of coöperatively connecting the same will serve as a shock-absorber, while at the same time allowing the wheel to be sufficiently rigid as to properly serve its proper functions.

In this application I make no claim to the specific construction of hub *per se*, since such construction forms the subject-matter of a copending application filed on even date herewith.

In Fig. 7 I have shown a slightly-modified form of the invention in which the spoke ends are shorter than in the form shown in the remaining figures of the drawings and of a chisel-end shape, the flanges 20 of the adjacent spoke being grooved to receive such chisel end.

From the foregoing, taken in connection with the accompanying drawings, it is thought the complete construction, operation, and many advantages of my invention will be readily understood by those skilled in the art to which the invention appertains.

What I claim is—

1. A vehicle-wheel comprising in combination a hub, a series of resilient spokes each secured at one end to the hub and having their other ends bent to overlap each other, said overlapped ends being flat and having inwardly-projecting flanges substantially as shown and described.

2. A vehicle-wheel comprising in combination, a hub, a series of resilient spokes each secured at one end to the hub and having their other ends bent to overlap each other, said overlapped ends having inwardly-projecting flanges, and also having outwardly-projecting flanges, and a tire held over the overlapping ends, substantially as shown and described.

3. A vehicle-wheel comprising in combination a hub, a series of resilient spokes each secured at one end to the hub and having their other ends bent to overlap each other, said overlapped ends having inwardly-projecting flanges, and a tire held over the overlapping ends of the spokes, substantially as shown and described.

4. A vehicle-wheel comprising in combination with a hub, a series of spokes having one end of each secured to said hub, and having overlapping ends bent to overlap and engage each other, said spokes having outwardly-projecting flanges, and a tire held over said overlapping ends by said flanges, said flanges having slots, substantially as shown and described.

5. A vehicle-wheel comprising in combination with a hub, a series of spokes having one end of each secured to said hub, and having overlapping ends bent to overlap and engage each other, said spokes having outwardly-projecting flanges, a tire held over said overlapping ends by said flange, said flanges having slots, said spoke-flanges being arranged to abut one another, substantially as shown and described.

6. A vehicle-wheel comprising in combination with a hub, a series of spokes having one end of each secured to said hub, and having overlapping ends bent to overlap and engage each other, said spokes having outwardly-projecting flanges, a tire held over said overlapping ends by said flanges, said flanges having slots, said spoke-flanges being arranged to abut one another, and having their abutting ends curved substantially as shown and described.

7. A resilient wheel having the spokes thereof extended to form a yieldable tread-surface and provided with flanges at each side of the tread-surfaces to form an outer peripheral channel, said flanges abutting one another, substantially as shown and described.

8. A resilient wheel having the spokes thereof extended to form a yieldable tread-surface, and provided with flanges at each side of the tread-surface to form a peripheral channel, said flanges abutting one another, and provided with slots, substantially as shown and described.

9. A resilient wheel having the spokes thereof extended to form a yieldable tread-surface, and provided with flanges at each side of the tread-surfaces to form a peripheral channel, said flanges abutting one another, and provided with slots, the abutting faces of said flanges being curved, substantially as shown and described.

10. A resilient wheel having the spokes thereof extended to form a flat yieldable tread-surface, and provided with flanges at each side of the tread-surfaces to form a peripheral channel, said flanges abutting one another, and a tire held in said channel, substantially as shown and described.

11. A resilient wheel having the spokes thereof extended to form a yieldable tread-surface, and provided with flanges at each side of the tread-surface to form a peripheral channel, said flanges abutting one another, and provided with slots, and a tire held in said channel, substantially as shown and described.

12. A resilient wheel having the spokes thereof extended to form a yieldable tread-surface, and provided with flanges at each side of the tread-surface to form a peripheral channel, said flanges abutting one another, and provided with slots, the abutting faces of said flanges being curved, and a tire held in said channel, substantially as shown and described.

13. A resilient wheel having the spokes thereof extended to form a yieldable tread-surface and provided with flexible flanges at each side of the tread-surfaces to form a peripheral channel.

14. A resilient wheel having the spokes thereof extended to form a yieldable tread-surface and provided with outwardly-extending flexible flanges at the sides of the tread-surface to form a peripheral recess or channel, a tire held in said channel, supplemental inwardly-projecting flanges on said spokes to embrace adjacent spokes substantially as shown and described.

15. A resilient wheel having the spokes thereof extended to form a yieldable tread-surface and provided with flanges at each side of the tread-surface to form an outer peripheral recess or channel, said spokes each terminating in projecting ends held in said channel substantially as shown and described.

16. A resilient wheel having the spokes thereof extended to form a flat yieldable tread-surface and provided with flanges at each side of the tread-surface to form a peripheral recess or channel, said spokes each terminating in projecting ends helds in said channel, and a tire held in said channel, substantially as shown and described.

17. A resilient wheel having the spokes thereof extended to form a flat yieldable tread-surface, means forming a part of said spokes for forming a peripheral channel, a tire held in said channel, said tire being of a diameter less than the maximum expanded diameter of the peripheral channel formed by the spoke ends substantially as shown and described.

18. A resilient wheel having the spokes thereof extended to form a flat yieldable tread-surface and provided with flanges to form a peripheral channel, and means held in said channel for holding said spokes normally compressed substantially as shown and described.

19. A resilient wheel having the spokes thereof extended to form a flat yieldable tread-surface and provided with flanges to form a peripheral channel, means held in said channel for holding said spokes normally compressed, and a tire held in said channel over said means, substantially as shown and described.

ALVIN ALEXANDER DAUGHERTY.

Witnesses:
A. E. DIETERICH,
MAY E. IMMICH.